United States Patent
Ford et al.

(10) Patent No.: US 9,852,441 B2
(45) Date of Patent: Dec. 26, 2017

(54) METHODS AND SYSTEMS FOR RECOMMENDING MEDIA ASSETS BASED ON SCENT

(71) Applicant: United Video Properties, Inc., Santa Clara, CA (US)

(72) Inventors: Robin Ford, Los Angeles, CA (US); Daniel Thomas Ward, Encino, CA (US); Paul Jensen, Menlo Park, CA (US); Michael R. Nichols, La Canada Flintridge, CA (US)

(73) Assignee: Rovi Guides, Inc., San Carlos, CA (US)

( * ) Notice: Subject to any disclaimer, the term of this patent is extended or adjusted under 35 U.S.C. 154(b) by 417 days.

(21) Appl. No.: 13/956,229

(22) Filed: Jul. 31, 2013

(65) Prior Publication Data

US 2015/0039421 A1  Feb. 5, 2015

(51) Int. Cl.
*G06Q 30/00* (2012.01)
*G06Q 30/02* (2012.01)

(52) U.S. Cl.
CPC ..... *G06Q 30/0251* (2013.01); *G06Q 30/0252* (2013.01); *G06Q 30/0269* (2013.01)

(58) Field of Classification Search
CPC .................................. G06Q 30/0251–30/0252
USPC .................................. 705/14.4, 14.49, 14.5
See application file for complete search history.

(56) References Cited

U.S. PATENT DOCUMENTS

| | | | |
|---|---|---|---|
| 5,477,913 A * | 12/1995 | Polk et al. | .................... 165/11.1 |
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,587,331 B2 | 9/2009 | Pelletier | |
| 7,588,726 B1 * | 9/2009 | Mouradian et al. | ............ 422/83 |
| 7,761,892 B2 | 7/2010 | Ellis et al. | |
| 8,046,801 B2 | 10/2011 | Ellis et al. | |
| 8,065,619 B2 * | 11/2011 | Agarwal | ................ G06Q 30/02 715/742 |
| 8,138,930 B1 * | 3/2012 | Heath | .......................... 340/601 |
| 8,359,234 B2 * | 1/2013 | Vieri | .................... G06Q 10/107 705/14.49 |
| 8,448,739 B2 * | 5/2013 | Kolich | .................... A61L 9/125 180/271 |
| 8,639,719 B2 * | 1/2014 | Fisher | ............... G06F 17/30029 707/776 |
| 9,262,367 B2 * | 2/2016 | Yeung | .................... G06F 15/16 |
| 2002/0071677 A1 * | 6/2002 | Sumanaweera | ... G06F 17/30265 396/429 |

(Continued)

OTHER PUBLICATIONS

Li, "Overview of Odor Detection Instrumentation and the Potential for Human Odor Detection in Air Matrices," MITRE Nanosystems Group, Mar. 2009 (45 pages).

*Primary Examiner* — Bennett M Sigmond

(74) *Attorney, Agent, or Firm* — Haley Guiliano LLP

(57) ABSTRACT

Methods and systems are disclosed for selecting media assets based on a scent detected at a location of a user device. For example, a media guidance application implemented on a user device may incorporate or have access to a scent detection component, which may determine one or more scents at the location of the user device. The media guidance application may then select a media asset that corresponds to the determined one or more scents.

20 Claims, 6 Drawing Sheets

(56) References Cited

U.S. PATENT DOCUMENTS

| | | | |
|---|---|---|---|
| 2002/0174430 A1 | 11/2002 | Ellis et al. | |
| 2003/0110499 A1 | 6/2003 | Knudson et al. | |
| 2004/0073608 A1* | 4/2004 | Bilchev | G06Q 30/02 709/203 |
| 2005/0251827 A1 | 11/2005 | Ellis et al. | |
| 2007/0036673 A1* | 2/2007 | Selander | A61L 9/122 422/5 |
| 2008/0133342 A1* | 6/2008 | Criou | G06Q 30/02 705/14.41 |
| 2009/0125641 A1* | 5/2009 | Garbow | G06F 3/011 710/5 |
| 2010/0153885 A1 | 6/2010 | Yates | |
| 2010/0164756 A1* | 7/2010 | Vanninen | 341/22 |
| 2012/0018528 A1* | 1/2012 | Samain | H04L 67/125 239/6 |
| 2012/0084248 A1* | 4/2012 | Gavrilescu | G06F 17/30867 706/52 |
| 2012/0265616 A1* | 10/2012 | Cao et al. | 705/14.58 |
| 2012/0312981 A1* | 12/2012 | Imai | 250/282 |
| 2013/0065640 A1* | 3/2013 | Song | H04M 1/677 455/556.1 |
| 2013/0154797 A1* | 6/2013 | Lee et al. | 340/5.74 |
| 2013/0195322 A1* | 8/2013 | Santhiveeran | G06Q 30/0269 382/118 |
| 2013/0246187 A1* | 9/2013 | Chau | G06Q 30/0222 705/14.66 |
| 2014/0156471 A1* | 6/2014 | Westphal | 705/28 |
| 2014/0282645 A1* | 9/2014 | Hammond | 725/12 |

\* cited by examiner

METHODS AND SYSTEMS FOR RECOMMENDING MEDIA ASSETS BASED ON SCENT

BACKGROUND OF THE INVENTION

In conventional cable and Internet systems, users have numerous media asset choices available for viewing at any one time. Due to the number of media asset choices, a user may benefit from a recommendation system that indicates particular media assets that may be relevant to a user.

SUMMARY

Accordingly, methods and systems are disclosed herein for selecting media assets based on a scent detected at a location of a user device. For example, a media guidance application implemented on a user device may incorporate or have access to a scent detection component, which may determine one or more scents at the location of the user device. The media guidance application may then select a media asset that corresponds to the determined one or more scents.

For example, if the determined scents indicate the presence of pets (e.g., a dog or cat) near the user device, the media guidance application may select media assets featuring pets, advertising products used by pet owners, and/or media assets typically enjoyed by pet owners. In another example, if the determined scents indicate the presence of a particular person near the user device, the media guidance application may select media assets targeted to that person.

In some aspects, the media guidance application may detect, using a scent detection component, a scent at a location of a user device and store the scent in memory. The media guidance application may then cross-reference the scent with a database associated with scents corresponding to media assets to determine a media asset associated with the scent, and generate for display a media asset on a display screen.

The media guidance application may also determine an object associated with the scent and determine media assets that are associated with the object. For example, the media guidance application may compare a scent detected at a location to a data structure to determine an object associated with the scent. For example, the media guidance application may input the scent into a first lookup table to determine an object associated with the scent, receive an output from the first lookup table identifying the object associated with the scent, and input the identified object into a second lookup table to determine a plurality of media assets corresponding to the identified object. The media guidance application may also display the identified object on a display screen associated with the user device and prompt the user to confirm the presence of the identified object or provide other options related to the identified object.

The scent detection component may perform various tests on a sample of material from the location to detect a scent. For example, the scent detection component may measure a change in frequency of a quartz crystal resonator associated with the sample (e.g., quartz crystal microbalance), measure spectra of masses of molecules in the sample (e.g., mass spectrometry), or measure the different rates at which chemical compounds of the sample travel in a gas stream (e.g., gas chromatography).

The media guidance application may also compare a determined concentration of a scent to a threshold concentration before cross-referencing the scent with the database. For example, the media guidance application may establish a minimum concentration of a scent that is required before the media guidance application determines a media asset associated with the scent in order to prevent the media guidance application from cross-referencing every scent, no matter how minute, that is detected by the scent detection component.

The media guidance application may also initiate the scent detection component based on current atmospheric conditions at the location. For example, the media guidance application may obtain an atmospheric sample of the location and process the atmospheric sample in order to determine proportions of atmospheric gasses in the atmospheric sample. The proportions of atmospheric gasses in the atmospheric sample may then be compared to standard proportions, which indicate typical proportions of atmospheric gasses at the location at the current time. The media guidance application may then detect the scent in response to the proportions not corresponding to the standard proportions. For example, in response to detecting a change in room temperature or room pressure (e.g., indicating a user has entered the location), the media guidance application may activate the scent detection component in order to select a media asset.

In some aspects, the media guidance application may generate a profile of scents typically detected at the location. For example, in addition to recommending a media asset based on the detection of a scent, the media guidance application may also consider the frequency and concentration of the scent at the location. For example, if a scent is typically detected at the location (or detected in large quantities), the scent may more accurately depict the conditions at the location than a scent that is detected only once (or detected in low quantities).

In some aspects, the media guidance application may receive requests for a media recommendation (e.g., from a user) or a request for an advertisement (e.g., from a content provider or distributor), which may cause the media guidance application to determine a scent at a location of a user device in order to provide a media recommendation that corresponds to the scent at the location. For example, a user may wish to view or an advertiser may wish to present media assets associated with the current conditions at the location of the user device. For example, if a scent detection component detects the scent of spaghetti, the media guidance application may determine to present media assets relevant to spaghetti (e.g., advertisements for spaghetti sauce, movies featuring the consumption of spaghetti, and/or any other media asset likely to be enjoyed by a user that enjoys spaghetti).

It should be noted, the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
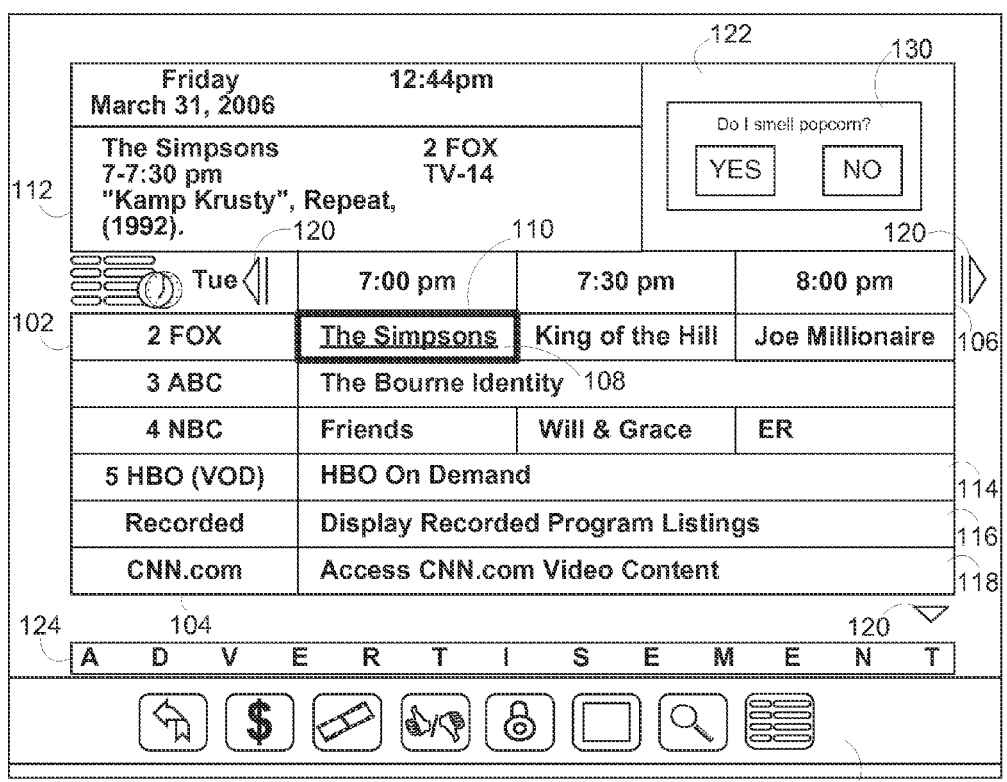
FIG. 1 shows an illustrative media guidance application that may be used to display media assets selected based on a scent at a location in accordance with some embodiments of the disclosure.

Methods and systems are described herein for selecting media assets based on a scent detected at a location of a user device. For example, a media guidance application implemented on a user device may incorporate or have access to a scent detection component, which may determine one or more scents at the location of the user device. The media guidance application may then select a media asset that corresponds to the determined one or more scents. As referred to herein, a "media guidance application," a "guidance application," and/or a "interactive guidance application," refers to an interface that allows users to efficiently navigate content selections and easily identify, view, or access content that they may desire.

As used herein, a "scent detection component" refers to any hardware and/or software capable of, or used in conjunction with other hardware and/or software, distinguishing one scent from another. A scent detection component may include a specialized computer and/or instructions on a computer-readable medium for replicating human olfactory analysis. For example, a scent detection component may include any device intended to detect odors or flavors. Devices intended to detect odors or flavors may be referred to as "electronic noses." The use of electronic noses is described in greater detail in Pelletier U.S. Pat. No. 7,587,331, issued Sep. 8, 2003, which is hereby incorporated by reference herein in its entirety.

A scent detection component may include chemical sensors, biosensors, gas chromatography systems, mass spectrometer-based systems, and/or hybrid systems. The use of various sensors and systems for use in scent detection is described in greater detail in Li, "Overview of Odor Detection Instrumentation and the Potential for Human Odor Detection in Air Matrices," MITRE Nanosystems Group, March 2009, which is hereby incorporated by reference herein in its entirety.

For example, a scent detection component may employ microelectromechanical systems, which rely on the modulation of surface acoustic waves to sense a physical phenomenon (e.g., a surface acoustic wave sensor or a quartz crystal microbalance sensor). In a surface acoustic wave sensor, a chemically sensitive film absorbs particular molecules, increasing the weight of the film, which causes acoustic waves to travel slower. After converting the acoustic waves to electronic signals, the surface acoustic wave sensor can detect the change in the speed of the acoustic waves.

Quartz crystal microbalancing measures a mass per unit area of a compound by measuring the change in frequency of a quartz crystal resonator. In quartz crystal microbalancing, the resonance is disturbed by the addition or removal of a small mass due to oxide growth/decay or film deposition at the surface of the acoustic resonator. The change in resonance can then be detected once the acoustic wave is converted to an electric signal.

The scent detection component may also include metal oxide sensors. In metal oxide sensors trapped electrons of absorbed molecules induce band bending, which results in a change in conductivity of a sensing layer. The change in resistance of the sensing layer may then be detected by the metal oxide sensor.

The scent detection component may also include the use of mass spectrometry (e.g., the measurement of spectra of masses of molecules in a sample of materials to determine particular compounds that are present) and gas chromatography (e.g., the measurement of the different rates at which chemical compounds of a sample of material travel in a gas stream).

The scent detection component may also incorporate or have access to sensors for detecting atmospheric conditions (e.g., air temperature, surface temperature of objects, humidity, wind speed and direction, precipitation, visibility, etc.). For example, in some embodiments, the media guidance application may obtain an atmospheric sample of the location and process the atmospheric sample in order to determine proportions of atmospheric gasses in the atmospheric sample. The proportions of atmospheric gasses in the atmospheric sample may be compared to standard proportions (e.g., proportions indicative of the normal proportions of atmospheric gasses at a location and at a current time).

It should be noted that any embodiment disclosed herein for selecting a media asset based on a scent may also be applied to selecting a media asset based on a detected atmospheric condition. For example, in response to a detecting a rise in temperature or a change in humidity at a location of a user device (e.g., indicating that a user near the user device may become thirsty), the media guidance application may select an advertisement for a beverage.

In addition, in some embodiments, the detection of a particular environment condition or a change thereof may activate/trigger the detection of a scent by a scent detection component. For example, a change in the surface temperature of the user device (e.g., indicating a user is now holding the user device) may trigger the media guidance application to detect a scent using a scent detection component. Likewise, the detection of a scent may activate/trigger the detection of an atmospheric condition by a scent detection component. For example, the presence of a particular odor/aroma (e.g., associated with a particular user) near a user device may trigger the media guidance application to detect the current atmospheric conditions at the location of the user device using the scent detection component.

Additionally or alternatively, the media guidance application may trigger the scent detection component to detect a scent and/or atmospheric condition in response to receiving request for a media recommendation (e.g., from a user) or a request for an advertisement (e.g., from a content provider or distributor).

Additionally or alternatively, a media guidance application may use a scent detection component to detect both a scent and an atmospheric condition at the location of a user device to select a media asset. Thus, it should be noted that any embodiment disclosed herein describing the use of a scent or atmospheric condition to select a media asset may also be applied to an embodiment using a detected scent and atmospheric condition to select a media asset.

For example, the media guidance application may determine that a particular user is near a user device based on a scent, detected by the scent detection component, associated with the particular user. In addition, the media guidance application may determine that the current atmospheric condition (e.g., high humidity, low pressure) indicates that rain is likely. In response, the media guidance application may select a media asset for display to the user based on the current conditions (e.g., an advertisement targeted towards the user based on information in a user profile associated with the user for umbrellas).

The media guidance application may also determine an object associated with the scent and/or atmospheric condition and determine media assets that are associated with the object. For example, the media guidance application may compare a scent and/or atmospheric condition detected at a location to a data structure to determine an object associated with the scent. For example, the data structure may include a plurality of records corresponding to various scents and/or atmospheric conditions. Each record may, in turn, be associated with a plurality of fields indicating objects associated with the scent and/or atmospheric condition.

When processing information received or in databases and/or data structures, the media guidance application may use multiple types of optical character recognition and/or fuzzy logic. For example, if the particular data processed is textual data, using fuzzy logic, the media guidance application (e.g., via a content recognition module or algorithm incorporated into, or accessible by, the media guidance application) may determine two fields and/or values to be identical even though the substance of the data or value (e.g., two different spellings) is not identical. It should be noted that the data could contain values (e.g., the data could be expressed in binary or any other suitable code or programming language), which may or may not be human-readable.

Upon detecting a scent and/or atmospheric condition the media guidance application may input the scent into the data structure (e.g., a lookup table) to determine an object (or a description of an object) associated with a scent and/or atmospheric condition. The media guidance application may receive an output from the data structure identifying the object (or the description of an object) associated with the scent and/or atmospheric condition. The output may then be inputted into the same or a different data structure (e.g., a second lookup table) to determine a plurality of media assets corresponding to the object (or the description of the object).

It should be noted that any embodiment described herein relating to determining media assets associated with scents may also be applied to determining media assets associated with object identified by a scent. For example, the media guidance application may determine that based on a scent that a user uses a particular object (e.g., a brand of body wash). In response, the media guidance application may select media assets (e.g., advertisements for body wash) and generate the media assets for display to the user.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings and/or media assets, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. Media guidance data may also include information about scents, atmospheric conditions, objects, and/or descriptions of objects associated with one or more media assets.

Figure 2:
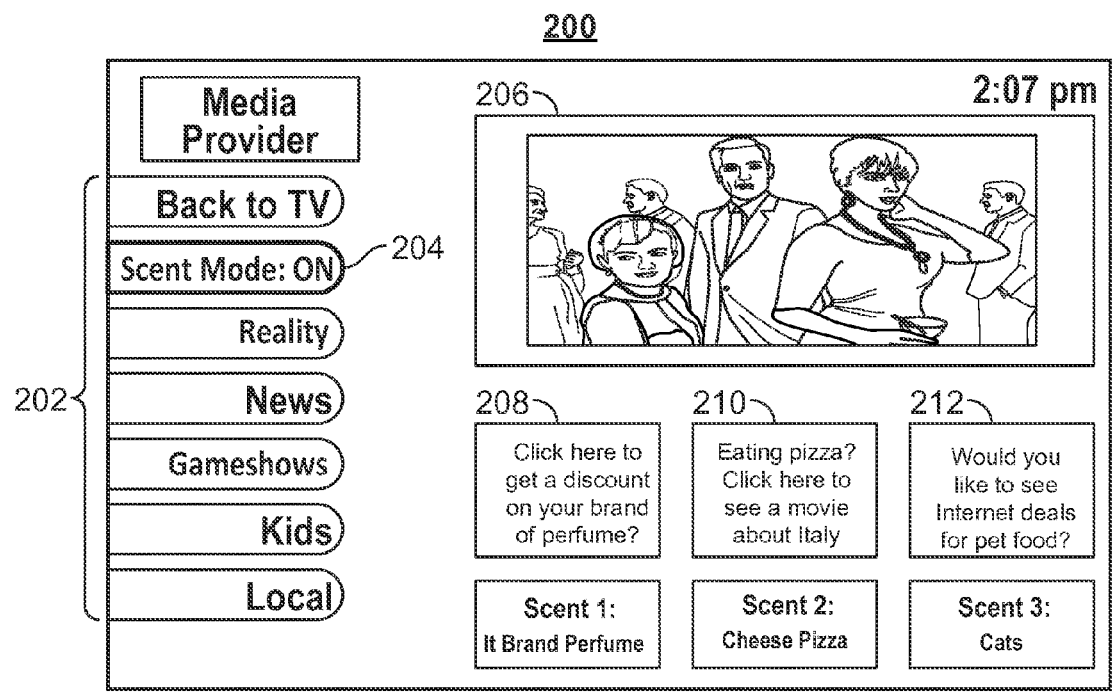
FIG. 2 shows an illustrative media guidance application that may be used to activate various features of the media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows an illustrative media guidance application that may be used to display media assets selected based on a scent at a location. For example, display 100 includes prompt 130. Prompt 130 may be generated in response to the media guidance application detecting a scent and/or object near a user device (e.g., associated with a display screen displaying display 100).

For example, the media guidance application may also determine an object (e.g., popcorn) associated with a scent and determine media assets that are associated with the object (e.g., feature-length films associated with the consumption of popcorn or typically viewed while consuming popcorn). The media guidance application may also display the determined scent and/or object on a display screen (e.g., display 100) associated with the user device and prompt the user to confirm the presence of the object or provide other options related to the object (e.g., links to popcorn providers, options to order popcorn, media assets associated with popcorn, etc.).

FIG. 1 also shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110.

Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. FIG. 2 shows an illustrative media guidance application that may be used to activate various features of the media guidance application. Video mosaic display 200 includes selectable options 202 for content information organized based on content type, genre, and/or other features. In display 200, selectable option 204, corresponding to the activation of a scent detection mode, is selected, thus causing the media guidance application to select/recommend media assets associated with scents detected neat the user device.

For example, while asset 206 is displayed, assets 208, 210, and 212 are also displayed (e.g., as pop-ups, overlays, and/or separate windows). Asset 208 corresponds to a first detected scent, "It Brand Perfume," accordingly the media guidance application has provided a targeted advertisement for perfume. Asset 210 corresponds to a second detected scent, "Cheese Pizza," accordingly the media guidance application has provided a media asset above Italy, the culinary birthplace of pizza. Finally, asset 212 corresponds to a third detected scent, "Cats," accordingly the media guidance application has provided an Internet link to promotions for cat food.

In display 200 the assets may provide graphical images including cover art, still images from the content, video clip previews, live video from the content, or other types of content that indicate to a user the content being described by the media guidance data in the listing. Each of the graphical assets may also be accompanied by text to provide further information about the content associated with the asset.

The listings in display 200 are of different sizes (i.e., asset 206 is larger than assets 208, 210, and 212), but if desired, all the listings may be the same size. Assets may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
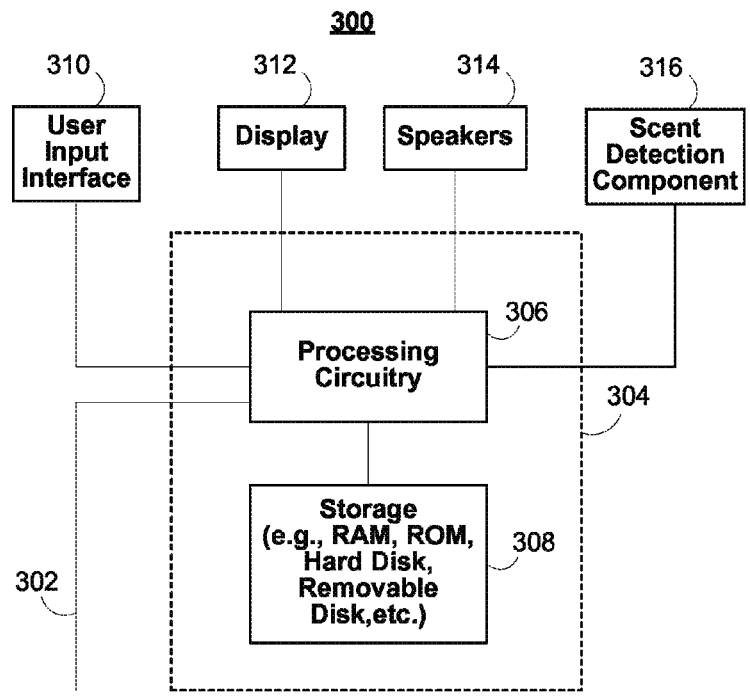
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

User device 300 also includes scent detection component 316. Scent detection components may include any of the materials, including hardware and software necessary for performing the scent and/or atmospheric condition detection described herein. For example, the scent detection component may include, or have access to, chemical sensors, biosensors, gas chromatography systems, mass spectrometer-based systems, and/or hybrid systems, or any hardware/software for detecting a scent or flavor. In addition, the scent detection component may include, or have access to, any hardware/software for detecting atmospheric conditions (e.g., thermometers, barometers, hygrometers, altimeters, etc.). Scent detection component 316 may be incorporated into user device 300 or may be a separate component that is accessible by user device 300.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
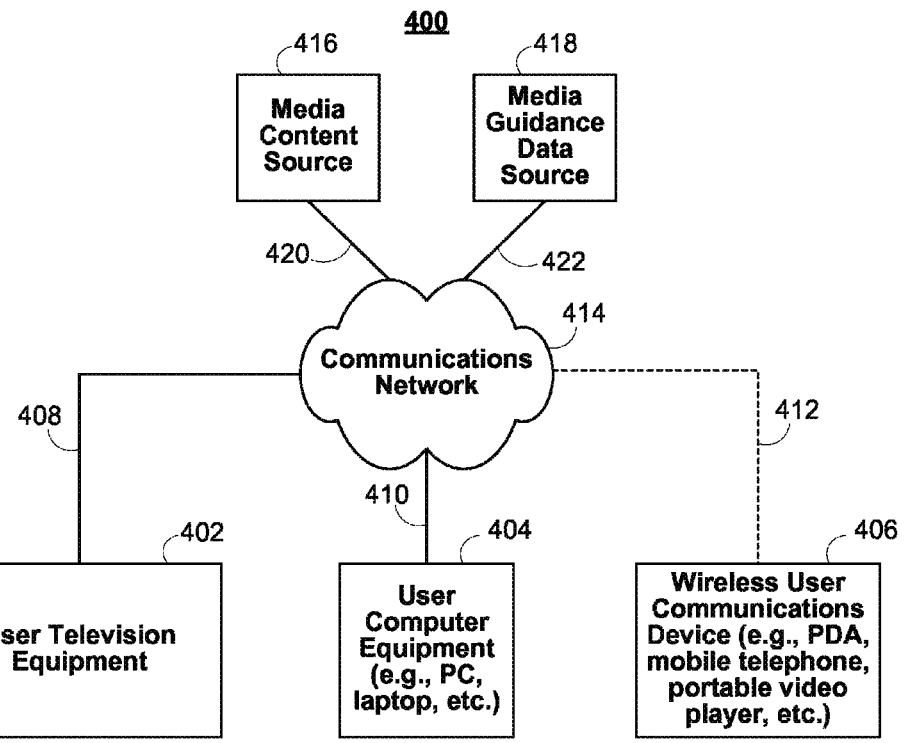
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
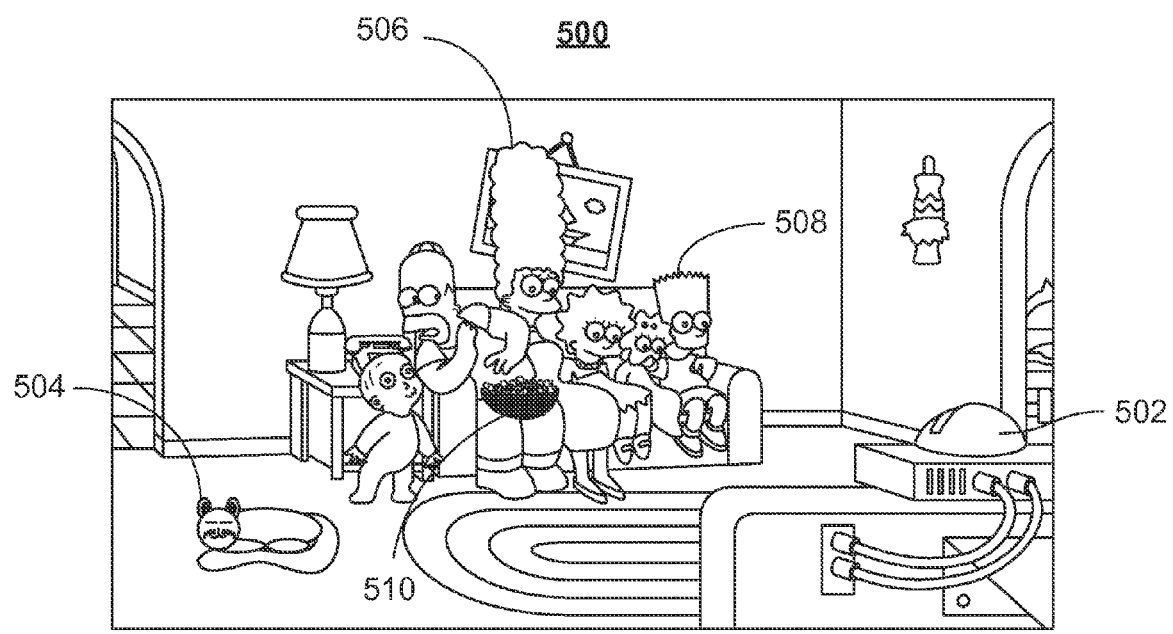
FIG. 5 shows an illustrative location featuring various scents that may be detected by a media guidance application in accordance with some embodiments of the disclosure.

FIG. 5 shows an illustrative location featuring various scents that may be detected by a media guidance application. Location 500 features numerous objects that may produce scents detected by a scent detection component 502. For example, location 500 includes pet 504, person 506, person 508, and food 510, any of which may produce a scent used by the media guidance application to select a media asset.

It should be noted that location 500 may also include various other scents. For example, other objects (e.g., furniture, appliances, garbage, a geographical region of the location, etc.) may produce ambient scents. However, in some embodiments, the presence of these scents, even if detected by the media guidance application, may not affect the selection of a media asset. For example, the media guidance application (or the scent detection component) may be calibrated to adjust for the presence of ambient scents. For example, the media guidance application may associate location 500 with a plurality of scents that are continuously present. Because the plurality of scents are always present, the media guidance application may not consider them when selecting a media asset.

For example, the media guidance application may generate a profile of scents typically detected at the location. The profile may include a log of all scents that should or should not affect media asset selection. For example, the log may include a list of all ambient scents. Additionally or alternatively, the profile may include a log of the frequency and concentration of each scent at the location.

The log may also include proportions and/or ratios of particular airborne chemicals and/or compounds at the location. For example, in some embodiments, the media guidance application may compare a concentration, proportion, and/or ratio of a scent to a threshold concentration, proportion, and/or ratio before cross-referencing the scent with the database. A detected scent may only affect the selection of a media asset if the concentration, proportion, and/or ratio of the scent and/or compound associated with the scent corresponds to (e.g., exceeds) the threshold concentration, proportion, and/or ratio. For example, the media guidance application may establish a minimum concentration proportion, and/or ratio of a scent that is required before the media guidance application determines a media asset associated with the scent in order to prevent the media guidance application from cross-referencing any scent and/or compound detected at location 500.

For example, the media guidance application may have an initial calibration or set-up period during which it detects the concentration, proportion, and/or ratio of all scents, compounds, etc. at the location. During subsequent uses (e.g., when selecting a media asset based on a scent at the location), the scent detection component may pare the concentration, proportion, and/or ratio of the previously detected scents, compounds, etc.

Additionally or alternatively, the media guidance application may receive base or standard concentrations, proportions, and/or ratios for scents, compounds, etc. at the location from a remote location. For example, a media guidance application implemented on user device (e.g., user equipment device 402, 404, and/or 406 (FIG. 4)) may obtain a log of the concentrations, proportions, and/or ratios for scents, compounds, etc. at the location from media content source 416 (FIG. 4), media guidance data source 418 (FIG. 4)), and/or any device accessible via communications network 414 (FIG. 4)).

In some embodiments, the scent profile and/or log of the concentrations, proportions, and/or ratios for scents, compounds, etc. at the location may be stored locally (e.g., at storage 308 (FIG. 3)) or remotely (e.g., at a database located at media content source 416 (FIG. 4), media guidance data source 418 (FIG. 4)), and/or any device accessible via communications network 414 (FIG. 4)). The media guidance application may then query the local or remote storage to access data from the scent profile and/or log.

For example, the media guidance application may compare the scents of pet 504, person 506, person 508, and food 510, to the scent profile or log. In response to determining that the scents of pet 504, person 506, person 508, and food 510 do (or do not) correspond to ambient scents, the media guidance application may use the scents of pet 504, person 506, person 508, and food 510 to select media assets.

For example, the media guidance application may detect a scent associated with pet 504 and store the scent in memory (e.g., storage 308 FIG. 3)). The media guidance application may then cross-reference the scent associated with pet 504 with a database associated with scents corresponding to media assets to determine a media asset associated with the scent (e.g., a television program prominently featuring pets), and generate for display a media asset on a display screen (e.g., display 312 (FIG. 3)) associated with the use device (e.g., user device 300 (FIG. 3)).

The media guidance application may also select media assets associated with person 506, person 508, and food 510. For example, the media guidance application (e.g., via control circuitry 304 (FIG. 3) issuing/receiving instructions and information from scent detection component 316 (FIG.

3)) may detect a scent associated with a hair care product on person 506 and accordingly select a media asset associated with hair case products. The media guidance application may also detect a scent associated with person 508. The media guidance application may use this information to identify the presence of person 508 near the user device. In response, the media guidance application may retrieve a user profile associated with the user (e.g., indicating the user preferences associated with the user), and may use information in the user profile to select a media asset.

Additionally or alternatively, the media guidance application may also determine an object associated with a scent of food 510. For example, the media guidance application may compare the chemical properties of the scent of food 510 to a data structure to determine an object associated with the scent. The data structure may include a plurality of records each associated with different chemical properties. Upon determining that a record matches the chemical properties of the scent of food 510, the media guidance application may review one or more fields (e.g., indicating the objects or descriptions of the objects that correspond to the chemical properties in the record) associated with the record. The media guidance application may then receive the name of an object or a description of an object from the field. The media guidance application may then select a media asset associated with the name of the object or a description of the object. For example, if food 510 is determined to be popcorn, the media guidance application may select a media asset (e.g., prompt 130 (FIG. 1)) associated with popcorn.

It should be noted that the media guidance application may combine information related to one or more detected scents with other information. For example, in response to identifying that both person 506 and person 508 are near the user device (e.g., user equipment device 402, 404, and/or 406 (FIG. 4)), the media guidance application may determine a media asset that corresponds to information in user profiles for both person 506 and 508. In another example, the media guidance application may combine a detected scent (or the absence of a detected scent) with other information. For example, if the media guidance application (e.g., via scent detection component 316 (FIG. 3)) detects the absence of cooking odors during the usual dinner time of person 506 and person 508 (e.g. 8:30 PM as determined by a user profile associated with person 506 and/or person 508), the media guidance application may select (e.g., via control circuitry 304 (FIG. 3)) an advertisement for a local pizzeria. In another example, the media guidance application may detect a scent (e.g., carbon dioxide) determined (e.g., based on information in the scent profile) to be associated with a hazardous chemical, and a scent associated with person 506 (e.g., indicating that person 506 is near). In response, the media guidance application may generate for display an appropriate media asset (e.g., an alert or alarm) until the media guidance application no longer detects the scent of the hazardous chemical (e.g., indicting that the chemical is no longer present at the location) or the scent of person 506 (e.g., indicating that person 506 has evacuated the location). In another example, the media guidance application may detect a scent associated with an object (e.g., a person) that is not typically in at the location (e.g., a burglar). In response, the media guidance application may generate for display an appropriate media asset (e.g., an alert or alarm) until the object is no longer detected at the location.

In some embodiments, the media guidance application may also prioritize the selection of media assets based on particular scents. For example, the media guidance application may prioritize a selection of a media asset based on a scent associated with food 510 over a scent associated with pet 504 such that a selection of a media asset associated with food and/or a presentation of that media asset occurs before a selection of a media asset associated with a pet and/or a presentation of that media asset.

Additionally or alternatively, the media guidance application may prioritize the selection of media assets based on various detected scents by weighting selection criteria used to select a media asset. For example, the media guidance application determines that a plurality of media assets corresponds to a heavily-prioritized scent associated with food as well as a lightly-prioritized scent associated with pets, the media guidance application may select the media asset from the plurality of media assets that has the highest association with food (even is it has low association with food).

The priorities that are assigned to a particular scent may be selected by a user (e.g., via manual input, association with user preferences stored in a user profile, and/or any other suitable method). The priorities may also be assigned based on information received from a remote server (e.g., media content source 416, media guidance data source 418 (FIG. 4), and/or any other location accessible via communications network 414 (FIG. 4)) such as industry standards related to prioritization.

The priorities may also be based on other factors. For example, if the media guidance application determines that the current time is near a time typically associated with eating (e.g., dinner time), the media guidance application may prioritize scents related to food over scents related to non-food objects.

Figure 6:
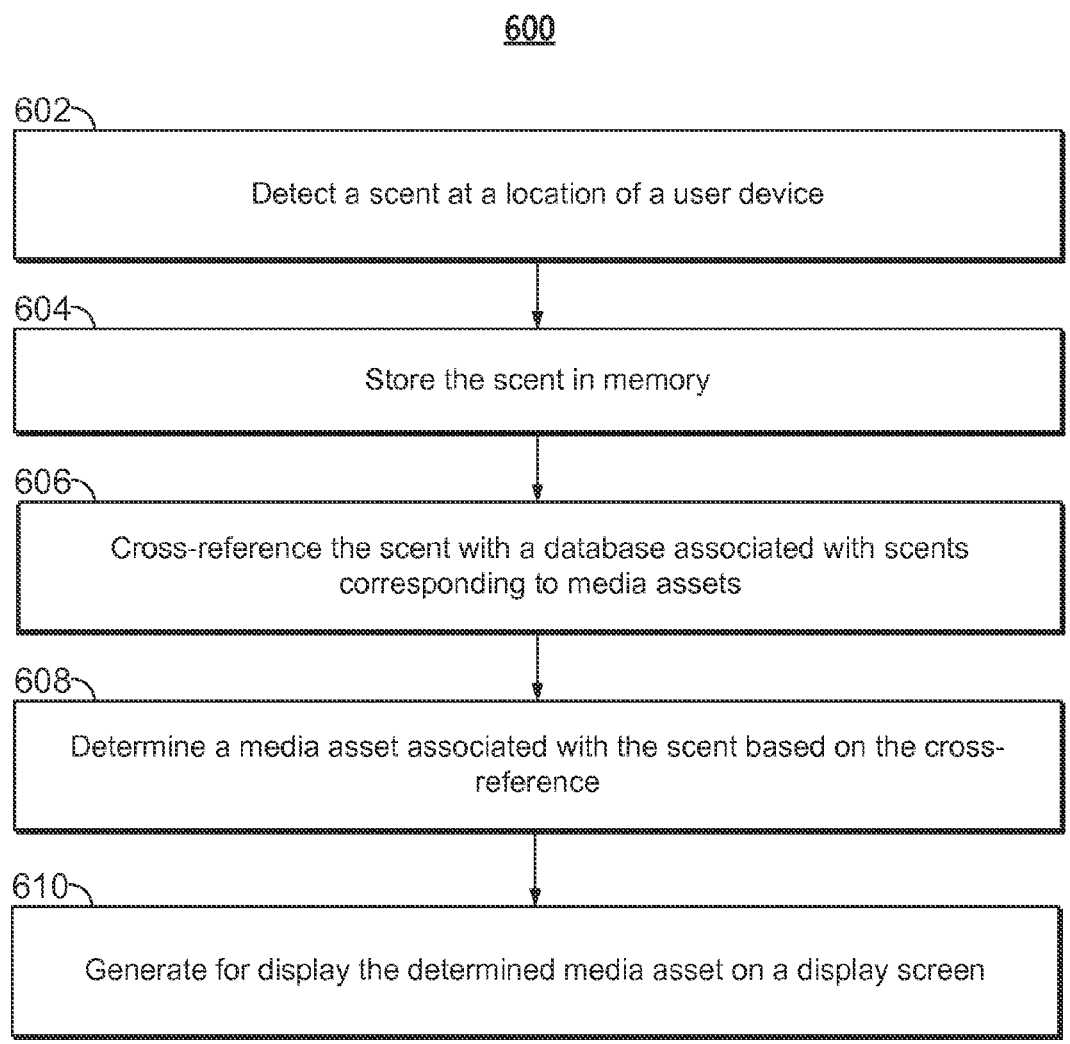
FIG. 6 is a flowchart of illustrative steps for selecting a media asset associated with a scent in accordance with some embodiments of the disclosure.

FIG. 6 is a flowchart of illustrative steps for selecting a media asset associated with a scent. Using process 600, a media guidance application may select a media asset (e.g., for display on display 312 (FIG. 3)) based on a scent detected at a location (e.g., location 500 (FIG. 5)). It should be noted that process 600 or any step thereof could be provided by any of the devices shown in FIGS. 3-4. For example, process 600 may be executed by control circuitry 304 (FIG. 3) in a user device (e.g., user device 300 (FIG. 3)) upon which the media guidance application is implemented.

Figure 7:
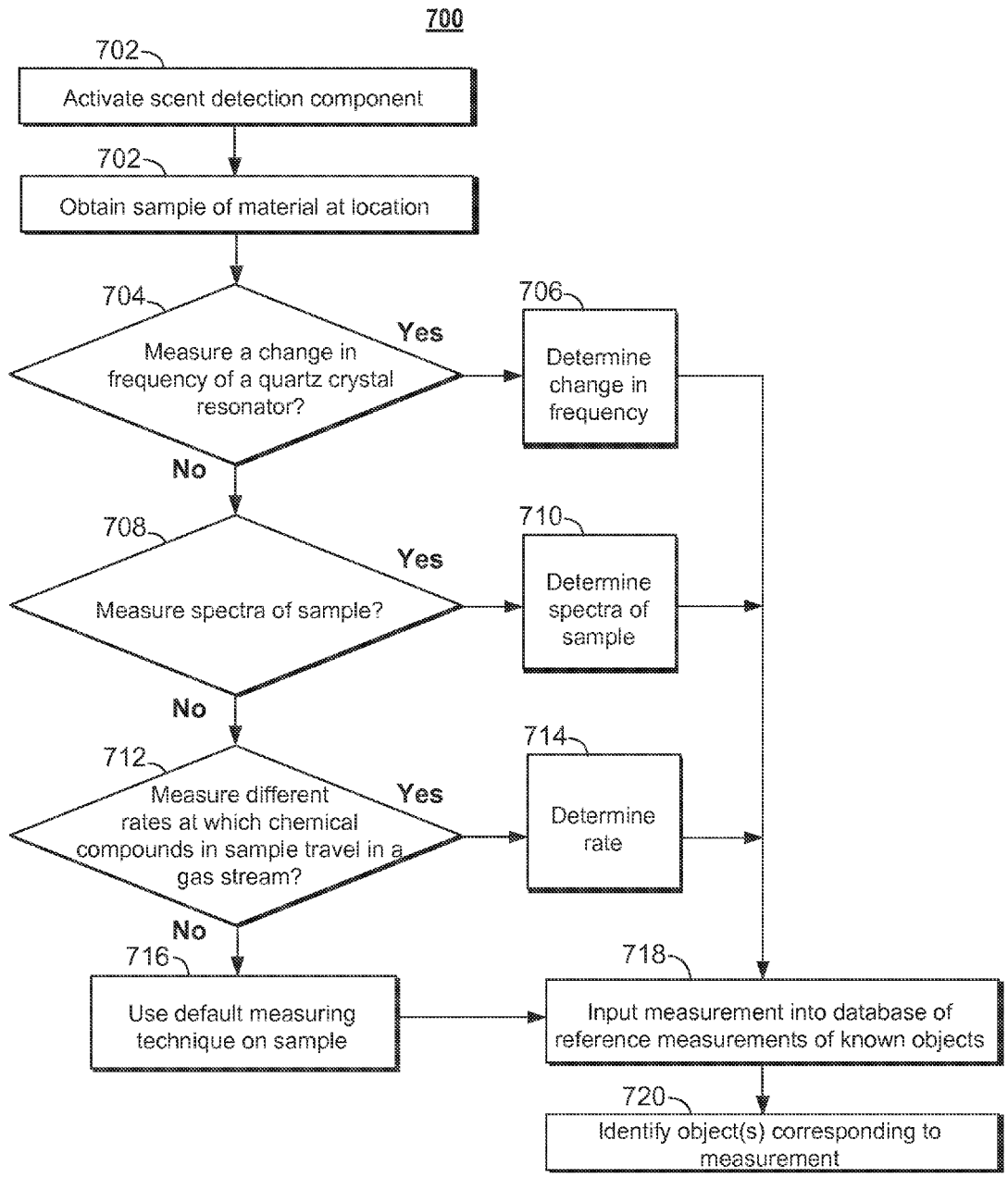
FIG. 7 is a flowchart of illustrative steps for determining a scent at a location in accordance with some embodiments of the disclosure.

At step 602, the media guidance application detects a scent at a location of a user device. For example, the media guidance application may access a scent detection component (e.g., scent detection component 316 (FIG. 3)) incorporated into or accessible by the media guidance application. In some embodiments, the scent detection component may incorporate one or more of the techniques discussed in process 700 (FIG. 7).

For example, using a chemical sensor, a biosensor, a gas chromatography system, a mass spectrometer-based system, and/or a hybrid system, the scent detection component (e.g., scent detection component 316 (FIG. 3)) may identify the chemical properties of a sample of material at a location (e.g., location 500 (FIG. 5)) of a user device (e.g., user equipment device 402, 404, and/or 406 (FIG. 4)).

At step 604, the media guidance application may store the scent in memory. For example, an electronic representation and/or identification of the scent and/or the chemical properties of the scent may be stored either locally (e.g., at storage 308 (FIG. 3)) or remotely (e.g., as media content source 416 (FIG. 4), media guidance data source 418 (FIG. 4), and/or any location accessible via communications network 414 (FIG. 4)).

At step 606, the media guidance application cross-references the scent with a database associated with scents corresponding to media assets. For example, the media guidance application may compare the electronic representation of the chemical properties of the scent with a data structure. For example, the data structure may be configured as a lookup table, in which the media guidance application may input the electronic representation of the chemical properties and receive one or more media assets corresponding to the electronic representation of the chemical properties of the scent.

At step 608, the media guidance application determines a media asset associated with the scent based on the cross-reference. For example, the media guidance application may store various information (e.g., media guidance data received from media guidance data source 418 (FIG. 4)) about different media assets, including information about scents, objects, and/or descriptions of objects associated with a particular media asset, in the database. The media guidance application may then filter the information in the database based on whether or not information about a given media asset is associated with a scent (or the electronic representation of the scent and/or chemical properties of a sample) in order to determine one or more media assets associated with the scent. Additionally or alternatively, the media guidance application may search remotely located databases (e.g., media content source 416, media guidance data source 418, and/or any database accessible via communications network 414 (FIG. 4)) for media assets (or information indicating a media asset is associated with a particular scent and/or object).

At step 610, the media guidance application generated for display the determined media asset on a display screen. For example, upon determining that a scent (e.g., a scent of food 510 (FIG. 5)) detected at a location (e.g., location 500 (FIG. 5)) is associated with a media asset (e.g., prompt 130 (FIG. 1)), the media guidance application may generate for display the media asset on a display screen (e.g., display 100 (FIG. 1)) associated with a user device (e.g., user device 300 (FIG. 3)).

In some embodiments, the media guidance application may also display the determined scent and/or object on the display screen associated with the user device and prompt the user to confirm the presence of the object (e.g., via a "Yes" or "No" on screen option (see, e.g., prompt 130 (FIG. 1))) or provide other options related to the object (e.g., links to advertisements and/or media assets, playback options for a media asset, etc.).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

FIG. 7 is a flowchart of illustrative steps for determining a scent at a location. Using process 700, a media guidance application may determine a scent (e.g., using scent detection component 316 (FIG. 3)) based on a scent detected at a location (e.g., location 500 (FIG. 5)). It should be noted that process 700 or any step thereof could be provided by any of the devices shown in FIGS. 3-4. For example, process 700 may be executed by control circuitry 304 (FIG. 3) in a user device (e.g., user device 300 (FIG. 3)) upon which the media guidance application is implemented.

At step 702, the media guidance application activates a scent detection component (e.g., scent detection component 316 (FIG. 3)). For example, the media guidance application may activate the scent detection component in response to a user input requesting a recommendation of a media (e.g., selecting selectable option 204 (FIG. 2)), in response to detecting a need for information (e.g., the identity of user currently using a user device) in order to target an advertisement, or in response to any other trigger (e.g., a detection of a change in an atmospheric condition).

At step 702, the media guidance application obtains a sample of the current atmospheric conditions and/or the current airborne chemicals in at the location. For example, the media guidance application may expose a sensor to the environment around the user device for a period of time. The period of time may be an amount of time that is necessary to obtain the sample as determined based on an analysis performed by the scent detection component (e.g., scent detection component 316 (FIG. 3)), may be an amount of time determined by the media guidance application (e.g., via control circuitry 304 (FIG. 3)), or may be an amount of time determined by a user.

At step 704, the media guidance application determines whether or not to measure a change in frequency of a quartz crystal resonator associated with the sample. For example, the scent detection component (e.g., scent detection component 316 (FIG. 3)) may include a quartz crystal microbalance sensor. If the media guidance application determines to measure the change in frequency of the quarts crystal resonator, the media guidance application proceeds to step 706 and determines the change in the frequency.

If the media guidance application determines not to measure the change in frequency of the quarts crystal resonator (e.g., the media guidance application may determine that an accessible scent detection component (e.g., scent detection component 316 (FIG. 3)) does not include a quartz crystal microbalance sensor or the media guidance application may determine that it could not obtain a sufficient sample for quartz crystal microbalancing). If so, the media guidance application proceeds to step 708.

At step 708, the media guidance application determines whether or not to measure spectra of masses of molecules in the sample. For example, the scent detection component (e.g., scent detection component 316 (FIG. 3)) may include a system for performing mass spectrometry. If the media guidance application determines to measure the spectra of masses of molecules in the sample, the media guidance application proceeds to step 710 and determines a spectra of the sample.

If the media guidance application determines not to measure the spectra of masses of molecules in the sample (e.g., the media guidance application may determine that an accessible scent detection component (e.g., scent detection component 316 (FIG. 3)) does not include a system for performing mass spectrometry or the media guidance application may determine that is could not obtain a sufficient sample for on which to perform mass spectrometry). If so, the media guidance application proceeds to step 712.

At step 712, the media guidance application determines whether or not to measure the different rates at which chemical compounds of the sample travel in a gas stream. For example, the scent detection component (e.g., scent detection component 316 (FIG. 3)) may include a system for performing gas chromatography. If the media guidance application determines to measure the different rates at which chemical compounds of the sample travel in a gas stream, the media guidance application proceeds to step 714 and determines the rate.

If the media guidance application determines not to measure the different rates at which chemical compounds of the sample travel in a gas stream (e.g., the media guidance application may determine that an accessible scent detection component (e.g., scent detection component 316 (FIG. 3)) does not include a system for performing gas chromatography or the media guidance application may determine that it could not obtain a sufficient sample on which to perform gas chromatography). If so, the media guidance application proceeds to step 716. At step 716, the media guidance application may use any sufficient scent and/or atmospheric condition sensing technique, or a combination of techniques, to measure the sample.

At step 718, the media guidance application inputs the measurement of the sample into a database of reference measurements of know objects. For example, a database may include a plurality of records each associated with different measurements. Upon determining that a record matches the measurement, the media guidance application may review one or more fields (e.g., indicating the objects or descriptions of the objects that correspond to the measurement) associated with the record.

At step 720, the media guidance application identifies an object or objects corresponding to the measurement. For example, the measurements of one sample may detect scents for multiple objects (e.g., pet 504, person 506, person 508, and food 510 (FIG. 5)). In response, the media guidance application may select a media asset corresponding to all of the detected scents or may select one or more media assets (e.g., assets 208, 210, and/or 212 (FIG. 2)) corresponding to one or more of the detected scents.

It should be noted that, in some embodiments, process 700 may include more or less of the scent detection technique. For example, in some embodiments, a scent detection component may include only a single type of scent detection (e.g., only a quartz crystal microbalance sensor). Furthermore, in some cases in which the scent detection component cannot obtain a sample or cannot determine a scent or object associated with the sample, the media guidance application may generate (e.g., on display 312 (FIG. 3)) an error message. The media guidance application may further prompt the user with specific instructions (e.g., requesting the user adjust the position of the scent detection component, reduce the number of ambient scents, etc.).

It should also be noted that, in some embodiments, process 700 may additionally or alternatively compare a sample or scent to a scent profile or log as discussed above. For example, the media guidance application may obtain a sample of a scent or chemical compound in the ambient atmosphere. The media guidance application may then determine the relative concentrations, proportions, and/or ratios of gasses or chemicals in the sample. The media guidance application may then log the data in a scent profile.

For example, the media guidance application may log scents in order to create a scent profile of long-term behavior (e.g., average number of meals eaten at the location per week, average time when meals are eaten, and the type of food typically consumed at meals). Long-term data (e.g., data and inferences drawn from detection occurring over weeks, years, etc.) of active scent detection may be used to influence demographic and/or other categories used for selecting media assets that are not directly related to a currently detected scent. Likewise, short-term data (e.g., data and inference drawn from current and/or real-time detection) could be used to select media assets that are directly related to a currently detected scent.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for selecting media assets, the method comprising:
   detecting, using a scent detection component, a plurality of scents at a location of a user device;
   determining an electronic representation of each of the plurality of scents based on the respective chemical properties of each of the plurality of scents;
   retrieving, using control circuitry, from memory a first priority associated with a first of the plurality of scents and a second priority associated with a second of the plurality of scents, wherein the first priority and the second priority are selected from a plurality of candidate priorities, and wherein the first priority and the second priority are selected on the basis of an association between a current time of day and each scent of the plurality of scents;
   in response to determining that the first priority is greater than the second priority, automatically selecting the first scent using the control circuitry;
   identifying, using a database of scents corresponding to media assets, a media asset associated with the selected first scent, wherein the database has a data structure configured as a lookup table, in which an electronic representation of the first scent is inputted into the database and the media asset is selected based on a correspondence to the electronic representation; and
   generating for display the identified media asset on a display screen.

2. The method of claim 1, wherein the scent detection component measures a change in frequency of a quartz crystal resonator associated with a sample of material from the location, measures spectra of masses of molecules in the sample, or measures different rates at which chemical compounds of the sample travel in a gas stream.

3. The method of claim 1 further comprising:
   identifying a user corresponding to one of the plurality of scents;
   retrieving a user profile associated with the identified user;
   receiving a user request for a media recommendation; and
   in response to receiving the user request, generating a media recommendation based on the user profile and the selected first scent.

4. The method of claim 1 further comprising:
   receiving a request for an advertisement; and
   in response to receiving the request, instructing the user device to detect the scents.

5. The method of claim 1 further comprising:
   generating a profile of scents previously detected at the location, wherein the profile of scents records a frequency and a concentration of each of the scents previously detected at the location; and selecting one scent of the scents based on the frequency and concentration of the one scent at the location.

6. The method of claim 1 further comprising:

determining a concentration associated with the scents;

comparing the concentration to a threshold concentration, wherein the threshold concentration indicates a minimum concentration required in order to access the database; and in response to the concentration corresponding to the threshold concentration, accessing the database.

7. The method of claim 1 further comprising:

acquiring an atmospheric sample of the location;

processing the atmospheric sample in order to determine proportions of atmospheric gasses in the atmospheric sample;

comparing the proportions to standard proportions, wherein the standard proportion indicates previous proportions of atmospheric gasses at the location at a current time; and detecting the scents in response to proportions not corresponding to the standard proportions.

8. The method of claim 1 further comprising:

inputting one of the scents into a first lookup table to determine an object associated with the one scent;

receiving an output from the first lookup table identifying the object associated with the one scent; and inputting a description of the object into a second lookup table to determine a plurality of media assets corresponding to the object.

9. The method of claim 8 further comprising:

generating for display on the display screen the object; and prompting a user for confirmation of the object.

10. The method of claim 8 further comprising generating for display on the display screen a plurality of options related to the object.

11. A system for selecting media assets, the system comprising:

control circuitry configured to:

detect a plurality of scents at a location of a user device;

determine an electronic representation of each of the plurality of scents based on the respective chemical properties of each of the plurality of scents;

retrieve from memory a first priority associated with a first of the plurality of scents and a second priority associated with a second of the plurality of scents, wherein the first priority and the second priority are selected from a plurality of candidate priorities, and wherein the first priority and the second priority are selected on the basis of an association between a current time of day and each scent of the plurality of scents;

in response to determining that the first priority is greater than the second priority, automatically select the first scent;

identify using a database of scents corresponding to media assets a media asset associated with the selected first scent, wherein the database has a data structure configured as a lookup table, in which an electronic representation of the first scent is inputted into the database and the media asset is selected based on a correspondence to the electronic representation; and generate for display the identified media asset on a display screen.

12. The system of claim 11, wherein the control circuitry is further configured to measure a change in frequency of a quartz crystal resonator associated with a sample of material from the location, measure spectra of masses of molecules in the sample, or measure different rates at which chemical compounds of the sample travel in a gas stream.

13. The system of claim 11, wherein control circuitry is further configured to:

identify a user corresponding to one of the plurality of scents;

retrieve a user profile associated with the identified user;

receive a user request for a media recommendation; and in response to receiving the user request, generate a media recommendation based on the user profile and the selected first scent.

14. The system of claim 11, wherein the control circuitry is further configured to:

receive a request for an advertisement; and in response to receiving the request, instruct the user device to detect the scents.

15. The system of claim 11, wherein the control circuitry is further configured to:

generate a profile of scents previously detected at the location, wherein the profile of scents records a frequency and a concentration of each of the scents previously detected at the location; and select one scent of the scents based on the frequency and concentration of the one scent at the location.

16. The system of claim 11, wherein the control circuitry is further configured to:

determine a concentration associated with the scents;

compare the concentration to a threshold concentration, wherein the threshold concentration indicates a minimum concentration required in order to access the database; and in response to the concentration corresponding to the threshold concentration, accessing the database.

17. The system of claim 11, wherein the control circuitry is further configured to:

acquire an atmospheric sample of the location;

process the atmospheric sample in order to determine proportions of atmospheric gasses in the atmospheric sample;

compare the proportions to standard proportions, wherein the standard proportion indicates previous proportions of atmospheric gasses at the location at a current time; and detect the scent in response to proportions not corresponding to the standard proportions.

18. The system of claim 11, wherein the control circuitry is further configured to:

input one of the scents into a first lookup table to determine an object associated with the one scent;

receive an output from the first lookup table identifying the object associated with the one scent; and input a description of the object into a second lookup table to determine a plurality of media assets corresponding to the object.

19. The system of claim 18, wherein the control circuitry is further configured to:

generate for display on the display screen the object; and prompt a user for confirmation of the object.

20. The system of claim 18, wherein the control circuitry is further configured to generate for display on the display screen a plurality of options related to the object.

* * * * *